(12) United States Patent
Chiu et al.

(10) Patent No.: US 9,424,769 B2
(45) Date of Patent: Aug. 23, 2016

(54) DISPLAY AND BRIGHTNESS ADJUSTING METHOD THEREOF

(71) Applicant: Wistron Corporation, New Taipei (TW)

(72) Inventors: Yu-Wei Chiu, New Taipei (TW); Chih-Hong Chu, New Taipei (TW); Chien-Jung Chen, New Taipei (TW); Rong-Zhe Li, New Taipei (TW)

(73) Assignee: Wistron Corporation, New Taipei (TW)

( * ) Notice: Subject to any disclaimer, the term of this patent is extended or adjusted under 35 U.S.C. 154(b) by 97 days.

(21) Appl. No.: 14/445,080

(22) Filed: Jul. 29, 2014

(65) Prior Publication Data
US 2015/0301670 A1 Oct. 22, 2015

(30) Foreign Application Priority Data

Apr. 21, 2014 (TW) .............................. 103114391 A

(51) Int. Cl.
| | |
|---|---|
| G09G 3/20 | (2006.01) |
| G06F 3/048 | (2013.01) |
| G06T 15/50 | (2011.01) |
| G06T 5/40 | (2006.01) |
| G06T 17/20 | (2006.01) |
| G06F 3/041 | (2006.01) |
| H04N 1/60 | (2006.01) |
| H04N 17/00 | (2006.01) |
| H04N 5/57 | (2006.01) |
| H04N 9/73 | (2006.01) |
| G06F 3/0487 | (2013.01) |

(52) U.S. Cl.
CPC ............ *G09G 3/2003* (2013.01); *G06F 3/0487* (2013.01); *G09G 3/20* (2013.01); *G09G 2320/0626* (2013.01); *G09G 2320/0686* (2013.01); *G09G 2354/00* (2013.01); *G09G 2360/144* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0199335 | A1* | 8/2011 | Li | G06F 3/0428 345/175 |
| 2012/0182307 | A1* | 7/2012 | Ueno | G03B 21/14 345/589 |
| 2013/0135235 | A1* | 5/2013 | Noutomi | G06F 3/041 345/173 |
| 2014/0313175 | A1* | 10/2014 | Trattler | G09G 3/3406 345/207 |
| 2015/0212602 | A1* | 7/2015 | Lor | G06F 3/0425 345/175 |

* cited by examiner

*Primary Examiner* — Wesner Sajous
(74) *Attorney, Agent, or Firm* — Jianq Chyun IP Office

(57) ABSTRACT

A display and a brightness adjusting method thereof are provided. In the method, an object located in front of a touch screen of the display is detected and a distance between the object and the touch screen is estimated and determined whether to be less than a first preset value. When the distance is less than the first preset value, the brightness of the touch screen is adjusted according to a light adjusting ratio in a brightness distribution curve. Then, time is accumulated after the brightness adjustment and when the accumulated time is over a second preset value, the brightness of the touch screen is resumed to original brightness.

14 Claims, 4 Drawing Sheets

DISPLAY AND BRIGHTNESS ADJUSTING METHOD THEREOF

CROSS-REFERENCE TO RELATED APPLICATION

This application claims the priority benefit of Taiwan application serial no. 103114391, filed on Apr. 21, 2014. The entirety of the above-mentioned patent application is hereby incorporated by reference herein and made a part of this specification.

BACKGROUND OF THE INVENTION

1. Field of the Invention

The invention relates to a display and a brightness adjusting method thereof, and particularly relates to a display and a method for adjusting brightness by sensing a distance from an object.

2. Description of Related Art

As the display technology advances, liquid crystal displays (LCDs) nowadays have the advantages of low power consumption, slimness and compactness, high resolution, high color saturation, long life span, and so forth. Therefore, the liquid crystal displays have replaced the the conventional cathode ray tube (CRT) displays and are broadly used in various electronic products having a display function. In our daily life, liquid crystal displays may be used in electronic products such as computer screens, televisions, and cameras. When it comes to teaching, liquid crystal displays may be used in electronic whiteboards.

The electronic whiteboards provide the teacher with a tool convenient for writing and teaching and are equipped with a touch screen for sensing a touch of a touch pen held by the teacher. In addition, based on a trace of the touch, a corresponding pattern may be drawn on the touch screen. Also, in order for all of the people at presence during a teaching activity to clearly read the contents written by the teacher, the electronic whiteboards are usually designed with enhanced brightness.

However, the design with enhanced brightness may expose the teacher's eyes in an environment of strong light for a long time when viewing the touch screen at a close distance, which may easily cause eye diseases such as glaucoma, near-sightedness, or floaters.

SUMMARY OF THE INVENTION

The invention provides a display and a brightness adjusting method thereof, through which brightness of a display is adaptively adjusted by sensing approaching or a touch of an object held by a teacher, so as to increase the comfort of the teacher viewing the display.

A brightness adjusting method of a display of the invention is adapted for a display having a touch screen. The method senses an object located in front of the touch screen, estimates a distance between the object and the touch screen, and determines whether the distance is less than a first preset value. When the distance is less than the first preset value, brightness of the touch screen is adjusted according to a light adjusting ratio in a brightness distribution curve. Then, time after the adjustment is accumulated, and the brightness of the touch screen is restored to original brightness when the accumulated time exceeds a second preset value.

According to an embodiment of the invention, the step of sensing the object located in front of the touch screen and estimating the distance between the object and the touch screen includes capturing at least two images including the object in front of the touch screen by using at least two image capturing units respectively disposed at at least two corners of the touch screen and estimating the distance between the object and the touch screen according to positions of the object and the touch screen in the images.

According to an embodiment of the invention, the step of sensing the object located in front of the touch screen and estimating the distance between the object and the touch screen includes sensing the object by using the touch screen, obtaining a distribution of capacitance values through a plurality of touch-sensing elements of the touch screen sensing the object, and estimating the distance between the object and the touch screen according to a characteristic of the distribution of the capacitance values.

According to an embodiment of the invention, before the step of sensing the object located in front of the touch screen and estimating the distance between the object and the touch screen, the method further senses ambient brightness of each of a plurality of regions of the touch screen by using at least two light sensors respectively disposed at at least two corners of the touch screen, and respectively adjusts the brightness of the regions according to the ambient brightness of each of the regions.

According to an embodiment of the invention, the step of adjusting the brightness of the touch screen according to the light adjusting ratio in the brightness distribution curve when the estimated distance is less than the first preset value includes determining whether time or a pressure that the object touches the screen exceeds a third preset value when the distance is less than the first preset value, and adjusting the brightness of the touch screen according to the light adjusting ratio in the brightness distribution curve when the time or the pressure exceeds the third preset value.

According to an embodiment of the invention, the step of adjusting the brightness of the touch screen according to the light adjusting ratio in the brightness distribution curve includes finishing the brightness adjustment of the touch screen within a preset period of time.

A display of the invention includes a touch screen, at least two image-capturing units, and a processor. The image capturing units are respectively disposed at at least two corners of the touch screen to capture at least two images including an object in front of the touch screen. The processor is coupled with the touch screen and the image capturing units and used to estimate a distance between the object and the touch screen according to positions of the object and the touch screen in the images. When the distance is less than a first preset value, brightness of the touch screen is adjusted according to a light adjusting ratio in a brightness distribution curve, and when the time after the brightness is adjusted exceeds a second preset value; the brightness of the touch screen is restored to original brightness.

According to an embodiment of the invention, the display further includes two light sensors. The light sensors are respectively disposed at at least two corners of the touch screen and used to sense ambient brightness of each of a plurality of regions of the touch screen. In addition, the processor respectively adjusts the brightness of the regions of the touch screen according to the ambient brightness of each of the regions sensed by the light sensors.

A display of the invention includes a touch screen and a processor. The touch screen includes a plurality of touch-sensing elements for sensing an object located in front of the touch screen to obtain a distribution of capacitance values through the touch-sensing elements sensing the object. The processor is coupled with the touch screen and used to estimate a distance between the object and the touch screen according to a characteristic of the distribution of capacitance values. When the distance is less than a first preset value, brightness of the touch screen is adjusted according to a light adjusting ratio in a brightness distribution curve, and when the time after the brightness is adjusted exceeds a second preset value; the brightness of the touch screen is restored to original brightness.

According to an embodiment of the invention, the display further includes at least two light sensors. The at least two light sensors are respectively disposed at at least two corners of the touch screen and used to sense ambient brightness of each of a plurality of regions of the touch screen. In addition, the processor respectively adjusts the brightness of the regions of the touch screen according to the ambient brightness of the regions sensed by the light sensors.

According to an embodiment of the invention, the regions are four regions respectively corresponding to four quadrants.

Based on the above, the display and the brightness adjusting method thereof make use of the sensors disposed around the touch screen to capture the images of the object located in front of the touch screen or directly use the touch screen to sense the object, so as to determine whether there is a person approaching or using the display and adaptively adjust the brightness of the touch screen, so as to provide a more comfortable and healthier environment for using the display.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
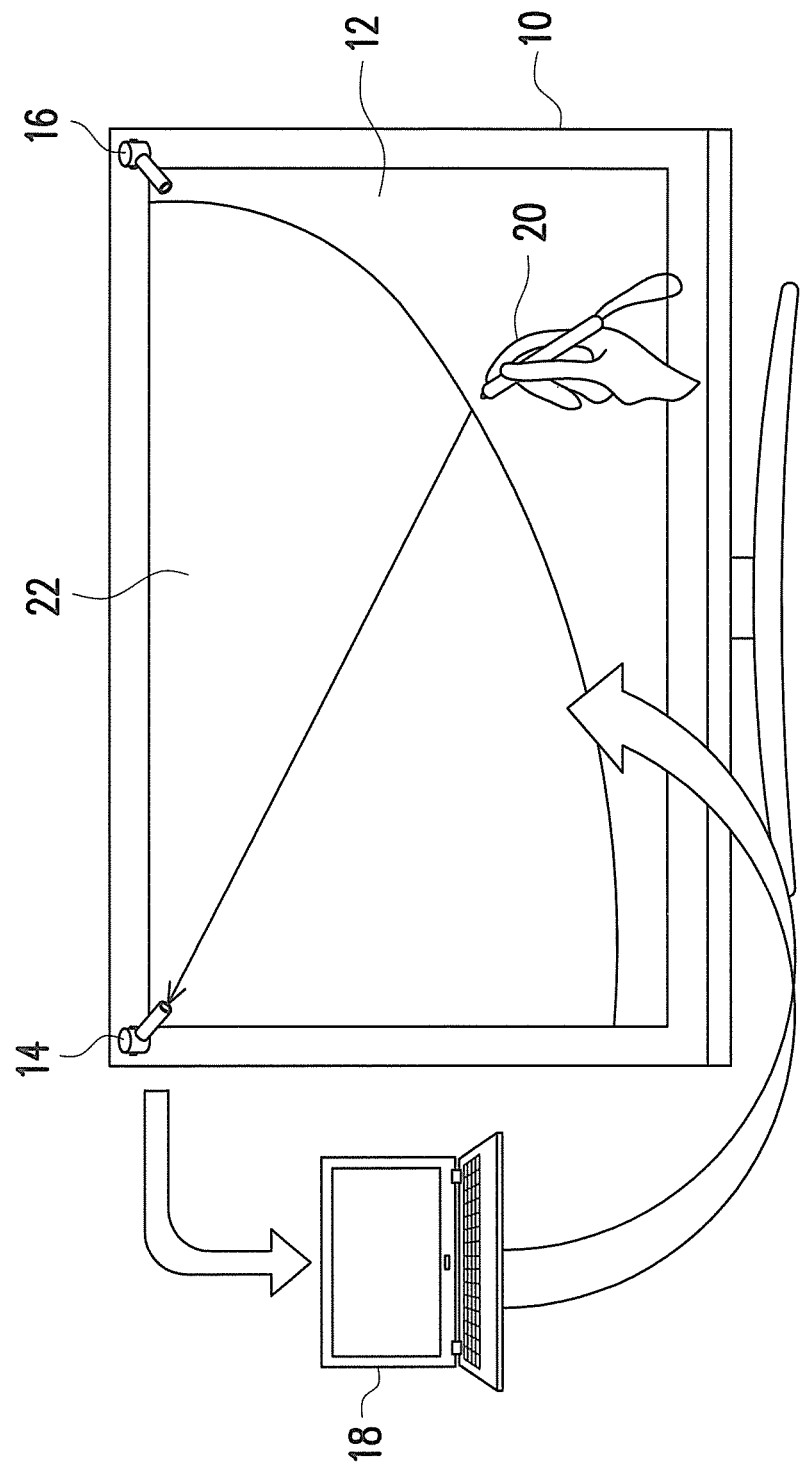
FIG. 1 is a schematic view illustrating a brightness adjusting method of a display according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Since an electronic whiteboard utilizes a touch screen to receive an operation of the user, the user is inevitably close to the touch screen and even contacts the touch screen when operating the electronic whiteboard, whether the operation is performed with a touch pen or directly with the user's finger. Therefore, the invention utilizes a sensor disposed around the touch screen to sense an object (e.g. touch pen or the user's finger) in front of the electronic whiteboard or directly utilizes the touch screen to sense the user's touch, so as to determine whether there is a user intending to operate the electronic whiteboard. When the object is sensed, brightness of the touch screen is adjusted to provide comfortable light, so as to make it more comfortable during the user's operation.

FIG. 1 is a schematic view illustrating a brightness adjusting method of a display according to an embodiment of the invention. Referring to FIG. 1, a display 10 includes a touch screen 12 and image capturing units 14 and 16 disposed at two corners of the touch screen 12. The image capturing units 14 and 16 are disposed toward opposite corners of the touch screen 12 and are capable of capturing images in front of the screen 12. As shown in FIG. 1, the image capturing unit 14 is capable of capturing an image within a range 22 in front of the touch screen 12. In other embodiments, the display 10 may use different numbers of image capturing units with different configurations. The invention is not limited thereto.

When the user's hand holds a touch pen 20 to write on the touch screen 12, the image capturing units 14 and 16 capture images including an object 20 (i.e. the user's hand holding the touch pen). Alternatively, when the object 20 approaches the touch screen 12 or contacts the touch screen 12, touch-sensing elements on the touch screen 12 also senses the object 20 and generates a plurality of physical quantities, such as capacitance values. The images captured by the image capturing units 14 and 16 or the physical quantities sensed by the touch-sensing elements of the touch screen 12 are sent to a processor 18 (disposed in the display 10, for example) for further analysis and processing. When the processor 18 determines that the object 20 is appeared in front of the touch screen 12 and a distance between the object 20 and the touch screen 12 is less than a preset value according to the data, the processor 18 controls the touch screen 12 to adjust the brightness so as to provide comfortable light. After the brightness is adjusted, the processor 18 continues sensing the object 20 in front of the touch screen 12. If the object 20 disappears, after a period of time, the processor 18 restores the brightness of the touch screen 12 back to the original brightness. Accordingly, an image with sufficient brightness can be provided for viewing of other people at presence during a period that the user ceases operation.

Figure 2:
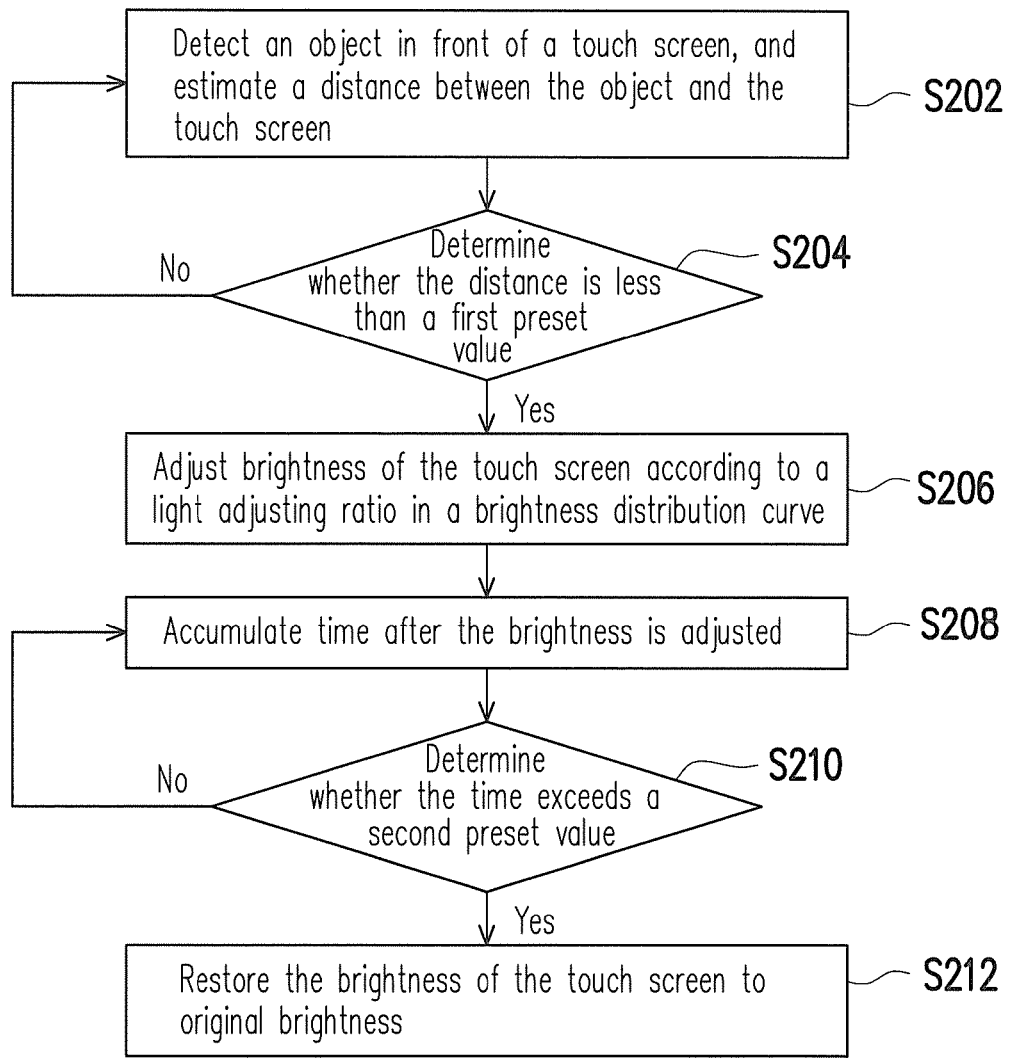
FIG. 2 is a flowchart illustrating a brightness adjusting method of a display according to an embodiment of the invention.

More specifically, FIG. 2 is a flowchart illustrating a brightness adjusting method of a display according to an embodiment of the invention. Referring to FIG. 2, the method of this embodiment is adapted for a display having a touch screen. The display is a display apparatus such as a computer screen, television, cell phone, tablet computer, or electronic whiteboard. The invention is not limited thereto.

First of all, the display senses an object located in front of a touch screen and estimates a distance between the object and the touch screen (Step S202). In an embodiment, the display estimates the distance between the object and the touch screen by taking an image in front of the touch screen and recognizing the object in the image by using an image recognition algorithm, for example. In another embodiment, the display directly utilizes a plurality of touch-sensing elements of the touch screen to sense the object and determines the distance between the object and the touch screen according to the capacitance values sensed by the touch-sensing elements, for example. Details with respect to how the above are embodied are respectively described in embodiments below.

Then, the display determines whether the distance between the object and the touch screen is less than a first preset value (Step S204). If the distance between the object and the touch screen is not less than the first preset value, it is determined that the object is not an object intending to operate the touch screen. Therefore, the flow is returned to Step S202 to continue sensing states of the object or other objects.

On the contrary, if the distance between the object and the touch screen is less than the first preset value, it is determined that the object is an object intending to operate the touch screen. At this time, the display adjusts brightness of the touch screen according a light adjusting ratio in a brightness distribution curve (Step S206). The brightness distribution curve is between the gamut curves ranging from 2.0 and 2.4, which may be used to adjust the brightness of the display to the brightness suitable for human eyes when viewing at a close distance. In addition, when the display adjusts the brightness, the adjustment is controlled to be finished within a certain period of time (e.g. 0 to 30 seconds), for example, so as to avoid discomfort of the viewer caused by a sudden change in brightness.

Figure 3:
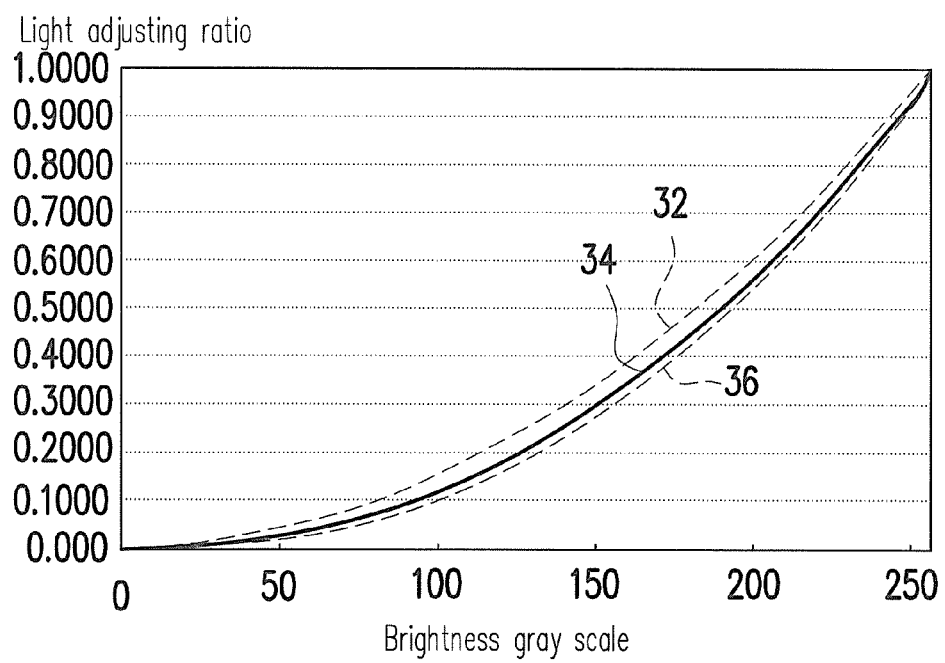
FIG. 3 is a schematic view illustrating a brightness distribution curve according to an embodiment of the invention.

For example, FIG. 3 is a schematic view illustrating a brightness distribution curve according to an embodiment of the invention. Referring to FIG. 3, the embodiment illustrates a relation between the brightness distribution curve used in the invention and the gamut curves. Curves 32 and 36 respectively represent the gamut curves 2.0 and 2.4, and a curve 34 represents the brightness distribution curve of the invention. Using the design of aforesaid light distribution not only optimizes human eye protection but fits energy conservation.

Back to the flow of FIG. 2, after the display adjusts the brightness, time is accumulated (Step S208), and whether the accumulated time exceeds a second present value is determined (Step S210). The accumulated time is the time during which the display does not sense the object, and this time may be used to determine whether the user still intends to operate the display. More specifically, when the accumulated time that the display does not sense the object exceeds the second preset value, it is determined that the user ceases operating the display. Therefore, the brightness of the touch screen is restored to the original brightness (Step S212). On the contrary, if the accumulated time that the display does not sense the object does not exceed the second preset value, it represents that the user may continue to operate the touch screen or may still be viewing the screen. Therefore, it is returned to Step S208 to continue accumulating time.

With the method above, the brightness of the display may be automatically adjusted from strong light to comfortable light when the user operates the display, so as to protect the user's eyes. When it is determined that the user ceases operating the display, the brightness of the display is adjusted back to the original brightness, so as to provide frames with sufficient brightness for the viewing of other people at presence.

It should be noted herein that regarding the step that the display senses the object located in front of the touch screen, the invention provides two different embodiments. System structures and operations of the two embodiments are respectively described below.

Figure 4:
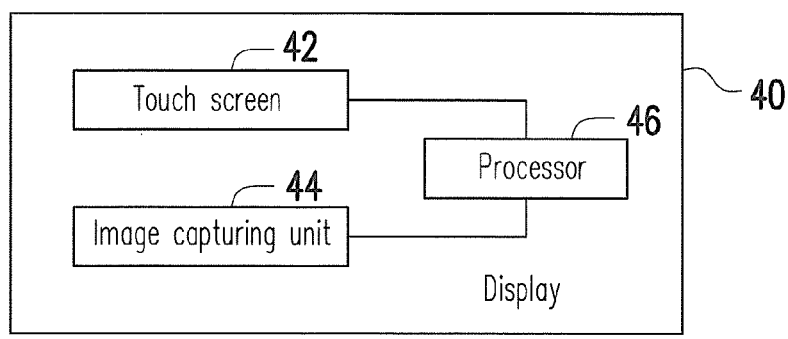
FIG. 4 is a block diagram illustrating a display according to an embodiment of the invention.

FIG. 4 is a block diagram illustrating a display according to an embodiment of the invention. Referring to FIG. 4, a display 40 of this embodiment is a liquid crystal display (LCD), a light-emitting diode (LED) display, a field emission display (FED), or a display of other types. The display 40 includes a touch screen 42, at least two image capturing units 44, and a processor 46. Functions of the components are described as follows.

The touch screen 42 is composed of a display panel such as an LCD display, an LED display, a FED display, or a display of other types and a touch panel such as a resistive touch panel or a capacitive touch panel, for example. The touch screen 42 may provide a display function and an operable function at the same time.

The image capturing units 44 includes an optical fixed-focus lens or an optical zooming lens and light-sensing elements such as charged coupled devices (CCD) or complementary metal-oxide semiconductor (CMOS) components, for example. The image capturing units 44 are disposed at at least two corners of the touch screen 42, for example, so as to capture images in front of the touch screen 42.

The processor 46 is, for example, a central processing unit (CPU) or other general-purpose or specific-purpose programmable microprocessors, a digital signal processor (DSP), a programmable controller, an application specific integrated circuit (ASIC), other similar elements, or a combination thereof. The processor 46 is coupled with the touch screen 42 and the image capturing units 44 to receive the images captured by the image capturing units 44 and recognize an object in the images.

Under the circumstance that the object is recognized in the images, the processor 46 may further estimate a distance between the object and the touch screen 42 according to, for example, a vertical distance between the object and the touch screen 42, a distance between the object and the periphery of the touch screen 42, and a proportional ratio therebetween, etc. In addition, the processor 46 may even locate an absolute position of the object on the touch screen 42 according to the images captured by the two or more image capturing units 44 at different positions. When the processor 46 determines that the distance is less than a first preset value, the processor 46 may then adjust brightness of the touch screen according to a light adjusting ratio in a brightness distribution curve. When the time that passes after the brightness is adjusted exceeds a second preset value, the processor 46 then restores the brightness of the touch screen 42 to the original brightness. The brightness distribution curve and the method of adjusting brightness is the same as or similar to the method of adjustment in the embodiments above. Therefore, details in this respect may be referred to the embodiments above, and no further details will be reiterated below.

Figure 5:
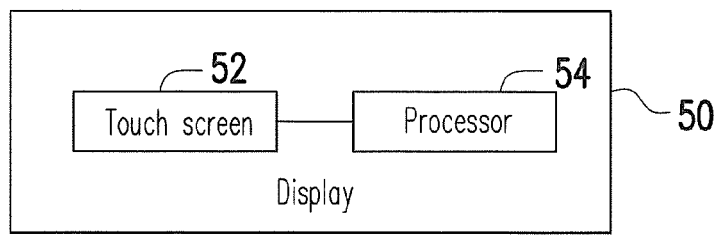
FIG. 5 is a block diagram illustrating a display according to an embodiment of the invention.

Moreover, FIG. 5 is a block diagram illustrating a display according to an embodiment of the invention. Referring to FIG. 5, a display 50 of this embodiment is a liquid crystal display, a light-emitting diode display, a field emission display, or a display of other types. The display 50 includes a touch screen 52 and a processor 54. Types of the touch screen 52 and the processor 54 are the same as or similar to the types of the touch screen 42 and the processor 46 in the previous embodiment. Therefore, no further details in this respect will be reiterated below.

What differs from the previous embodiment is that in this embodiment, the display 50 senses an object located in front of the touch screen 52 by directly using the touch screen 52. The touch screen 52 includes touch-sensing elements arranged into columns and rows. The touch-sensing elements are capacitive touch-sensing elements, surface acoustic wave touch-sensing elements, electromagnetic touch-sensing elements, near-field imaging touch-sensing elements, or the like, for example, which are capable of sensing a touch event or a suspension event of the user. The touch event refers to a touch of a finger, a palm, a body part or other conductive objects on the touch screen 52, and the suspension event refers to a finger, a palm, a body part, or other conductive objects approaching the touch screen 52. More specifically, when the object approaches or touches the touch screen 52, the plurality of touch-sensing elements on the touch screen 52 may respectively sense the object and generate corresponding capacitance values. By combining the capacitance values sensed by the touch-sensing elements, a distribution of capacitance values may be obtained. Accordingly, the processor 54 may estimate a distance between the object and the touch screen 52 according to a characteristic of the distribution of capacitance values. The characteristic is, for example, a parameter such as a peak value, a mean, or a variance of the distribution of capacitance values. The processor 54 may calculate the distance between the object and the touch screen 52 by comparing the characteristic with a parameter obtained through a prior test.

Regarding a circumstance that the object actually touches the touch screen 52, in another embodiment, the processor 54 may further determine whether the time or pressure that the object touches the touch screen 52 exceeds a preset value. The processor 54 proceeds to adjust brightness of the touch screen 52 when the time accumulated or the pressure measured exceeds the preset value. In this way, the user's operating behavior to the touch screen 52 may be determined more precisely.

With the method above, the display may automatically sense the user's operating behavior and flexibly adjust between strong light and comfortable light, so as to ensure the user's viewing quality and energy conservation.

In addition to sensing the approaching object, the invention may further combine sensing of an ambient light source, so as to adaptively adjust the screen brightness. By disposing two or more light sensors at different positions around the touch screen, the display may calculate an influence of the ambient light source in each region of the touch screen according to a light intensity sensed by the light sensors, so as to adjust the screen brightness by region. Thus, the user is allowed to view a consistent and comfortable image on the screen under various environments. Another embodiment is described in detail below for further illustration.

Figure 6:
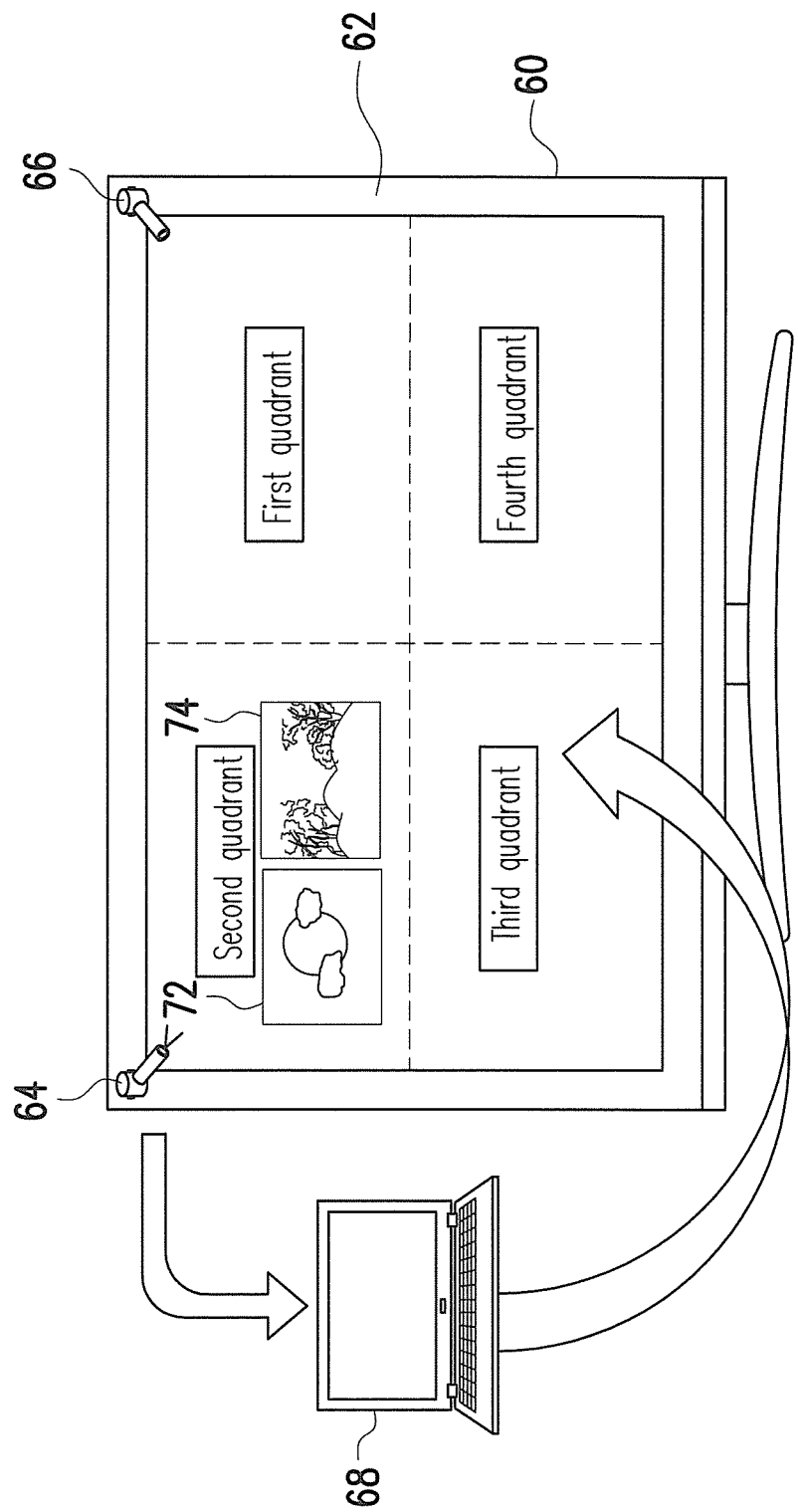
FIG. 6 is a schematic view illustrating adjusting screen brightness according to an ambient light source according to an embodiment of the invention.

FIG. 6 is a schematic view illustrating screen brightness adjustment according to ambient light source according to an embodiment of the invention. Referring to FIG. 6, a display 60 of this embodiment includes a touch screen 62 and light sensors 64 and 66 disposed at two corners of the touch screen 62. In addition, the light sensors 64 and 66 are, for example, light-sensing elements such as charge coupled devices (CCD) or complementary metal-oxide semiconductor (CMOS) components, which are capable of sensing a light intensity in the surroundings and sending the sensed light intensity data to a processor 68 (disposed in the display 60, for example) for further analysis and processing. Based on the principle that the light intensity decreases as the distance increases, the processor 68 calculates ambient light intensity of each region (including the first to fourth quadrants) according to relative positions and distances between the light sensors 64 and 66 and the touch screen 62 and the sensed light intensity, so as to respectively adjust screen brightness in the regions. For example, when the processor 68 senses that ambient brightness in the second quadrant is overly high, brightness or contrast of images 72 and 74 displayed in the second quadrant may be correspondingly increased, so as to prevent the user viewing the display 60 from being unable to clearly view contents on the screen due to an overly bright environment. It should be noted that after the processor 68 adjusts the brightness of the touch screen 62, the processor 68 may continue sensing an object located in front of the touch screen 62, so as to further adjust the brightness of the touch screen 62. Thus, the screen brightness most suitable for the user's viewing in the environment may be provided when the user's operating behavior is sensed. The way for sensing the object located in front of the touch screen 62 to adjust the screen brightness is similar to or the same as those described in the previous embodiments. Therefore, details in this respect are referred to the previous embodiments, and will not be reiterated below.

In view of the foregoing, the display and the brightness adjusting method thereof make use of the sensors disposed around the touch screen to capture the images of the object located in front of the touch screen or make use of the touch screen to sense the object, so as to determine the user's operating behavior and adaptively adjust the brightness of the touch screen, thereby providing more comfortable light for the user operating the display. In addition, the invention further combines sensing of the ambient light source, so as to individually adjust the screen brightness in different regions of the touch screen, thereby providing the screen brightness most suitable for the user's viewing in various environments.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A brightness adjusting method of a display, adapted for a display having a touch screen, at least two image capturing units respectively disposed at at least two corners of the touch screen and a processor, the method comprising:

sensing an object located in front of the touch screen and estimating a distance between the object and the touch screen, comprising:

capturing at least two images comprising the object in front of the touch screen by the at least two image capturing units; and estimating the distance between the object and the touch screen according to positions of the object and the touch screen in the images by the processor;

determining whether the distance is less than a first preset value by the processor;

adjusting brightness of the touch screen according to a light adjusting ratio in a brightness distribution curve by the processor when the distance is less than the first preset value; and accumulating time after the brightness is adjusted, and restoring the brightness of the touch screen to original brightness by the processor when the time exceeds a second preset value.

2. The brightness adjusting method of the display as claimed in claim 1, wherein before the step of sensing the object located in front of the touch screen and estimating the distance between the object and the touch screen, the method further comprises:

sensing ambient brightness of each of a plurality of regions of the touch screen by using at least two light sensors respectively disposed at at least two corners of the touch screen; and respectively adjusting the brightness of the regions according to the ambient brightness of each of the regions.

3. The brightness adjusting method of the display as claimed in claim 1, wherein the step of adjusting the brightness of the touch screen according to the light adjusting ratio in the brightness distribution curve by the processor when the distance is less than the first preset value comprises:

when the distance is less than the first preset value, determining whether a time or a pressure that the object touches the screen exceeds a third preset value by the processor; and when the time or the pressure exceeds the third preset value, adjusting the brightness of the touch screen according to the light adjusting ratio in the brightness distribution curve by the processor.

4. The brightness adjusting method of the display as claimed in claim 1, wherein the step of adjusting the brightness of the touch screen according to the light adjusting ratio in the brightness distribution curve by the processor comprises:
finishing the brightness adjustment of the touch screen by the processor within a preset period of time.

5. A display, comprising:
a touch screen;
at least two image capturing units, respectively disposed at at least two corners of the touch screen, and configured to capture at least two images comprising an object in front of the touch screen; and
a processor, coupled with the touch screen and the image capturing units, and configured to estimate a distance between the object and the touch screen according to positions of the object and the touch screen in the images, wherein when the distance is less than a first preset value, brightness of the touch screen is adjusted according to a light adjusting ratio in a brightness distribution curve, and when a time after the brightness is adjusted exceeds a second preset value, the brightness of the touch screen is restored to original brightness.

6. The display as claimed in claim 5, further comprising:
at least two light sensors, respectively disposed at at least two corners of the touch screen, and configured to sense ambient brightness of each of a plurality of regions of the touch screen, wherein
the processor respectively adjusts the brightness of the regions of the touch screen according to the ambient brightness of each of the regions sensed by the light sensors.

7. The display as claimed in claim 6, wherein the regions are four regions respectively corresponding to four quadrants.

8. A display, comprising:
a touch screen, comprising a plurality of touch-sensing elements for sensing an object located in front of the touch screen and obtaining a distribution of capacitance values through the touch-sensing elements sensing the object; and
a processor, coupled with the touch screen and configured to estimate a distance between the object and the touch screen according to a characteristics of the distribution of capacitance values, wherein when the distance is less than a first preset value, brightness of the touch screen is adjusted according to a light adjusting ratio in a brightness distribution curve, and when a time after the brightness is adjusted exceeds a second preset value, the brightness of the touch screen is restored to original brightness.

9. The display as claimed in claim 8, further comprising:
at least two light sensors, respectively disposed at at least two corners of the touch screen and configured to sense ambient brightness of each of a plurality of regions of the touch screen, wherein
the processor respectively adjusts the brightness of the regions of the touch screen according to the ambient brightness of each of the regions sensed by the light sensors.

10. The display as claimed in claim 9, wherein the regions are four regions respectively corresponding to four quadrants.

11. A brightness adjusting method of a display, adapted for a display having a touch screen comprising a plurality of touch-sensing elements and a processor, the method comprising:
sensing an object located in front of the touch screen and estimating a distance between the object and the touch screen, comprising:
sensing the object by using the touch screen to obtain a distribution of capacitance values obtained through the plurality of touch-sensing elements of the touch screen sensing the object; and
estimating the distance between the object and the touch screen according to a characteristic of the distribution of capacitance values by the processor;
determining whether the distance is less than a first preset value by the processor;
adjusting brightness of the touch screen according to a light adjusting ratio in a brightness distribution curve by the processor when the distance is less than the first preset value; and
accumulating time after the brightness is adjusted, and restoring the brightness of the touch screen to original brightness by the processor when the time exceeds a second preset value.

12. The brightness adjusting method of the display as claimed in claim 11, wherein before the step of sensing the object located in front of the touch screen and estimating the distance between the object and the touch screen, the method further comprises:
sensing ambient brightness of each of a plurality of regions of the touch screen by using at least two light sensors respectively disposed at at least two corners of the touch screen; and
respectively adjusting the brightness of the regions according to the ambient brightness of each of the regions by the processor.

13. The brightness adjusting method of the display as claimed in claim 11, wherein the step of adjusting the brightness of the touch screen according to the light adjusting ratio in the brightness distribution curve by the processor when the distance is less than the first preset value comprises:
when the distance is less than the first preset value, determining whether a time or a pressure that the object touches the screen exceeds a third preset value by the processor; and
when the time or the pressure exceeds the third preset value, adjusting the brightness of the touch screen according to the light adjusting ratio in the brightness distribution curve by the processor.

14. The brightness adjusting method of the display as claimed in claim 11, wherein the step of adjusting the brightness of the touch screen according to the light adjusting ratio in the brightness distribution curve by the processor comprises:
finishing the brightness adjustment of the touch screen by the processor within a preset period of time.

* * * * *